United States Patent
Lo et al.

(10) Patent No.: US 6,875,052 B1
(45) Date of Patent: Apr. 5, 2005

(54) REMAINDER ELECTRIC POWER DISTRIBUTING DEVICE OF A COMPUTER

(75) Inventors: Chun-An Lo, Hsin-Tien (TW); Yun-Chen Chen, Hsin-Tien (TW)

(73) Assignee: Zippy Technology Corp., Hsin-Tien (TW)

( * ) Notice: Subject to any disclaimer, the term of this patent is extended or adjusted under 35 U.S.C. 154(b) by 0 days.

(21) Appl. No.: 10/673,280

(22) Filed: Sep. 30, 2003

(51) Int. Cl.[7] .............................................. H01R 13/73
(52) U.S. Cl. ...................... 439/564; 439/545; 439/574; 439/934
(58) Field of Search ................................ 439/564, 545, 439/574, 934, 345, 364; 361/683, 686

(56) References Cited

U.S. PATENT DOCUMENTS

| | | | | |
|---|---|---|---|---|
| 3,315,131 A | * | 4/1967 | Boleslaw et al. | 361/601 |
| 3,390,369 A | * | 6/1968 | Zavertnik et al. | 439/97 |
| 3,824,524 A | * | 7/1974 | Glover | 439/282 |
| 4,096,352 A | * | 6/1978 | von Zweck | 174/153 R |
| 5,253,142 A | * | 10/1993 | Weng | 361/681 |
| 5,413,506 A | * | 5/1995 | Thompson | 439/660 |
| 5,709,569 A | * | 1/1998 | Buck et al. | 439/607 |
| 5,833,494 A | * | 11/1998 | Diaz | 439/573 |
| 5,838,559 A | * | 11/1998 | Lam | 363/146 |
| 5,852,544 A | * | 12/1998 | Lee | 361/683 |
| 5,980,313 A | * | 11/1999 | Kunishi et al. | 439/545 |
| 6,354,869 B1 | * | 3/2002 | Cranston et al. | 439/544 |
| 6,361,372 B1 | * | 3/2002 | Chiang | 439/680 |
| 6,450,833 B1 | * | 9/2002 | Brown et al. | 439/518 |
| 6,552,285 B1 | * | 4/2003 | Sears et al. | 200/294 |

* cited by examiner

*Primary Examiner*—Neil Abrams
(74) *Attorney, Agent, or Firm*—Birch, Stewart, Kolasch & Birch, LLP

(57) ABSTRACT

A remainder electric power distributing device of a computer for distributing the remainder electric power supplied form the power supply of the computer to auxiliary electronic devices includes at least one power jack and a connecting means. The power jack is electrically connected to the power supply of the computer and has at least one connecting interface exposed on the computer, such that another auxiliary electronic devices disposed outside the computer are electrically connected to the power jack and further share the electric power supplied from the power supply. The connecting means is used for installing the power jack to the computer.

14 Claims, 5 Drawing Sheets

US 6,875,052 B1

REMAINDER ELECTRIC POWER DISTRIBUTING DEVICE OF A COMPUTER

FIELD OF THE INVENTION

The present invention relates to a remainder electric power distributing device and, more particularly, to a remainder electric power distributing device of a computer having a plurality of power jack disposed outside the computer for distributing electric power to another auxiliary electronic device.

BACKGROUND OF THE INVENTION

Recently, the power supply of a computer generally includes a plurality of electric power output port with 12 volts and 5 volts. The electric power with different voltages is supplied to auxiliary devices by an electric connector disposed in the cover of the computer. The auxiliary devices are all installed in the computer, i.e. so-called "built-in type devices". The voltage input of the typical built-in type devices, e.g. a hard disk, a CD-ROM, a CD-R and a CD-RW, is 12 volts. The voltage input of the typical built-in type devices, e.g. a floppy and some speaker built in the computer, is 5 volts.

Generally speaking, the above-mentioned power supply installed in the computer has enough electrical power output for the above-mentioned built-in type devices. The power supply still has some remainder electric power which can be utilized, and the so-called remainder electric power is the electric power which is not applied yet within the maximal electric power output of the power supply.

The computer technology change with each passing day, the auxiliary devices disposed outside the computer are increased continuously, the necessary voltage of the auxiliary devices are also different, and therefore each auxiliary device generally has a rectifier (called as a transformer) whose of a plug is inserted into a mains socket. For above reason, the neighborhood of the computer and the mains socket is fill of electric wires, the transformers, and switching sockets. According to the above-mentioned computer, there will be not only an unfavorable view but also an inconvenience for user.

In particular, for example, the difference between various specifications of the electric power input port of a monitor leads to limit the monitor in conformity with the computer. General speaking, according to CRT monitors, the computer has a socket disposed on the back thereof and the socket can directly supply the electric power to the CRT monitor, but the necessary voltage of most of LCD monitors differ from that of CRT monitors. For above reason, LCD monitor must be additionally equipped with a transformer, and the LCD monitor must be supplied with necessary electric power by the mains socket, so as to cause the user inconvenience.

Accordingly, there exists a need for a remainder electric power distributing device of a computer to solve the above-mentioned problems and disadvantages.

SUMMARY OF THE INVENTION

It is a primary object of the present invention to provide a remainder electric power distributing device of a computer having a plurality of power jack disposed outside the computer for distributing the electric power to another auxiliary electronic device.

It is another object of the present invention to utilize the remainder electric power supplied from the power supply of the computer and to avoid the trouble and inconvenience caused by installing the transformer and the rectifier be auxiliary electronic devices disposed outside the computer.

In order to achieve the foregoing objects, the present invention provides a remainder electric power distributing device of a computer for distributing the remainder electric power supplied form the power supply of a computer to auxiliary electronic devices. The remainder electric power distributing device of a computer includes at least one power jack and a connecting means. The power jack is electrically connected to the power supply of a computer and has at least one connecting interface exposed on the computer, such that another auxiliary devices disposed outside the computer are electrically connected to the power jack and further share the electric power supplied from the power supply. The connecting means is used for installing the power jack to the computer.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
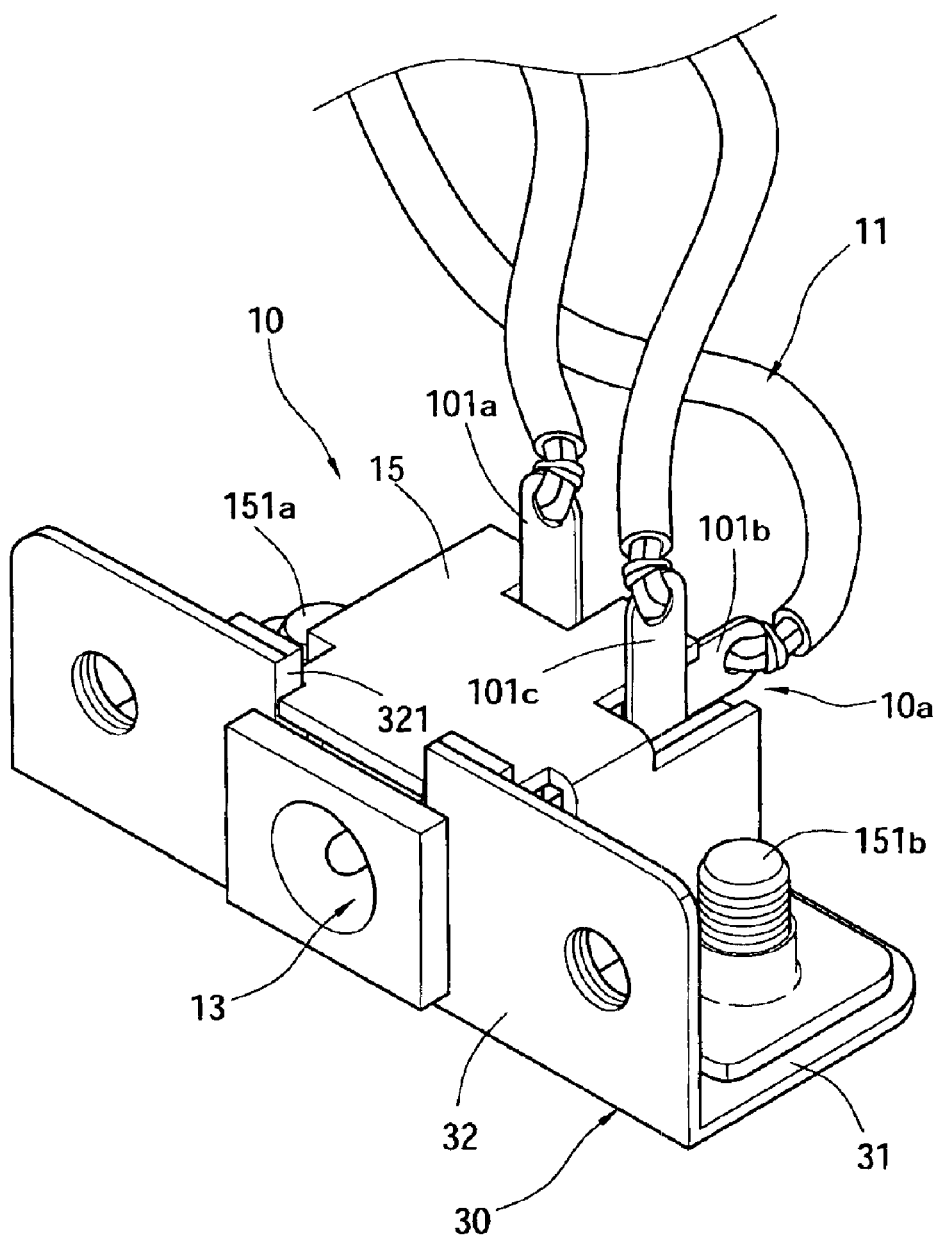
FIG. 1 is a perspective view of a remainder electric power distributing device according to the first embodiment of the present invention.

Referring to FIG. 1, 5, they depict the basic aspect of the embodiments of the remainder electric power distributing device according to the present invention. The remainder electric power distributing device mainly includes a power jack 10 and a connecting means.

The power jack 10 is electrically connected to the power supply 21 of a computer 20 by a plurality of electric wires 11 and a connector 12, and has at least one connecting interface exposed on the computer, such that another auxiliary electronic devices disposed outside the computer 20 is electrically connected to the power jack 10 and further share the electric power supplied from the power supply 21.

The connecting means is used for installing the power jack 10 to the computer.

Figure 5:
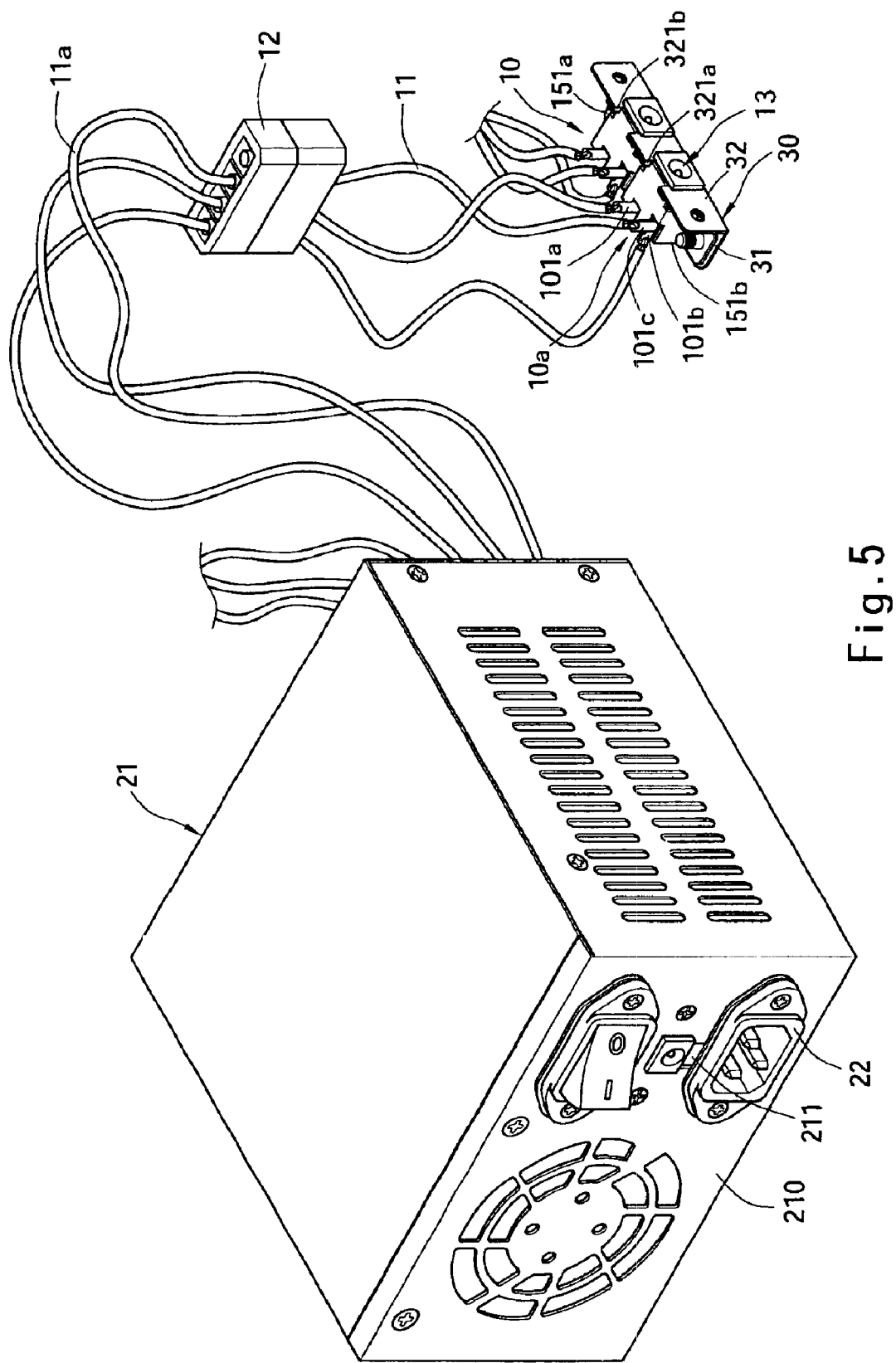
FIG. 5 is a perspective view of a remainder electric power distributing device and the power supply of a computer.

Referring to FIG. 1, 2, they depict the first embodiments of the remainder electric power distributing device according to the present invention. The power jack 10 can be realized by using a normal direct current (DC) socket 10a. The DC socket 10a generally has a plurality of electrode contacts 101a, 101b and 101c respectively for supplying the electric power, connecting to ground, and filtering waves. The electrode contact 101a, 101b, 101c are electrically connected to the power supply 21 of the computer 20 by a set of electric wires 11 and/or the connector 12 (showed in FIG. 5). Of course, the DC socket 10a is not intended to limit the power jack 10 to the specific embodiment, and those skilled in the art understand that the above-mention DC socket 10a can be replaced by different socket to replace in accordance with the connecting wires 11 and/or the connector 12.

The connecting interface exposed on the above-mentioned DC socket has a power inlet 13 to couple with the plug which matches with the power inlet 13. The auxiliary electronic devices disposed outside the computer are just electrically connected to the power jack 10 by the plug 14 and further share the electric power from the power supply 21.

The above-mentioned connecting means mainly has a support 30 and a neck 102 which is disposed around the DC socket 10a, so as to support the power jack 10. The support 30 has at least two connecting elements 310a, 310b that can be fixed on the normal back plate 40 of the computer 20. The connecting elements 310a, 310b in the preferred embodiment are bolts 310a, 310b.

Figure 2:
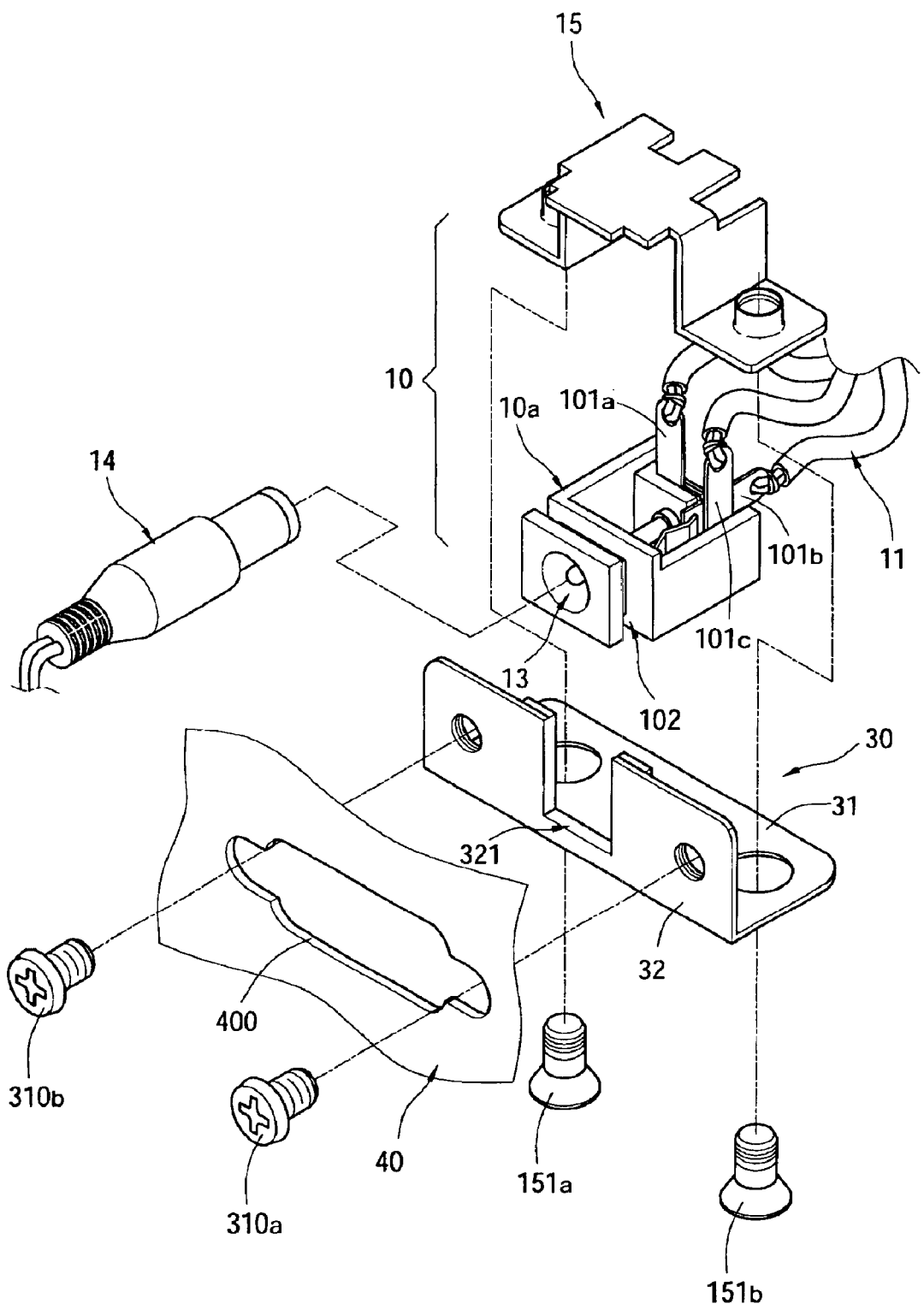
FIG. 2 is an exploded perspective view of a remainder electric power distributing device according to the first embodiment of the present invention.

Basically, the support 30 further has a supporting portion 31 and a connecting portion 32 connected to the normal back plate 40 of the computer 20. Generally, the normal back plate 40 of the computer 20 must has some position 400 which is reserved in advance for installing an input/output (I/O) port. The above-mentioned connecting portion 32 is fixed at the position 400 by the connecting elements 310a, 310b. At least one neck 102 is disposed around the DC socket 10a, the connecting portion 32 is a plate shaped element and has a breach 321 which can just coupled to the neck 102, and then the DC socket 10a is coupled to the connecting portion 32 by the neck 102. In addition, in order to fix the DC socket 10a to the support 30, a cover 15 is used for fixing the DC socket 10a to the supporting portion 31 of the support 30, shown in FIG. 2. The cover 15 is fixed on the supporting portion 31 by a plurality of bolts 151a, 151b.

Figure 3:
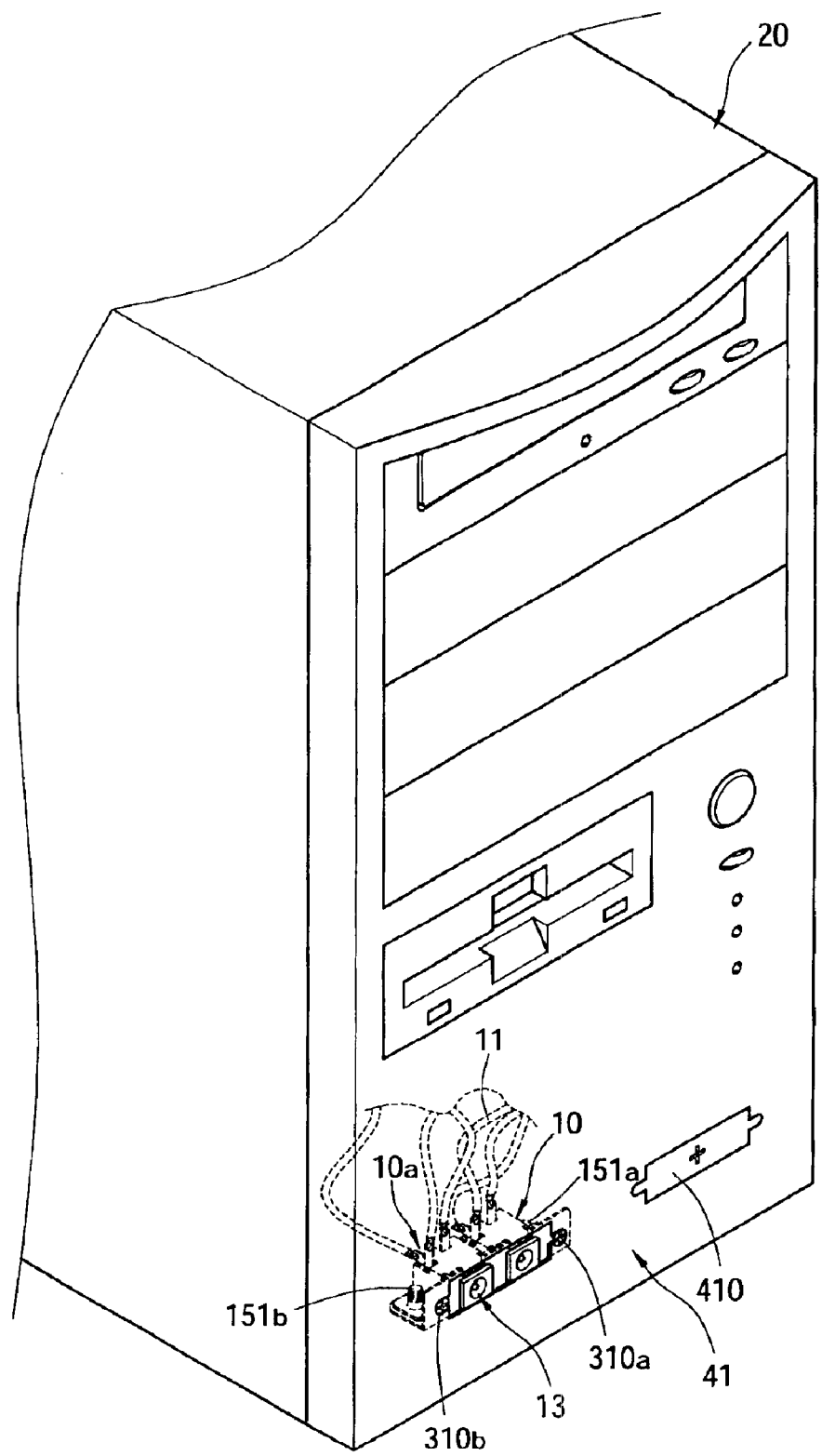
FIG. 3 is a perspective view of a remainder electric power distributing device and a computer according to the second embodiment of the present invention.

Referring to FIG. 3, it depicts the second embodiments according to the present invention. The second embodiment is characterized in that the number of the DC socket 10a of the power jack 10 is increased and the power jack 10 is installed at the position 410 which is reversed in advance for installing the I/O port on the front plate 41 of the computer 20. Basically, the support 30 in the first embodiment slightly differs from the support 30 in the second embodiment (referring to FIG. 5 again), and the connecting portion 32 of the support 30 in the second embodiment has two breach 321a, 321b, which can be disposed on the one DC socket 10a. Furthermore, if the parallel connecting technology in a circuit is utilized, the electric power supplied from the single set of electric wire 11a and/or connector 12 of the power supply 21 of the computer 20 is distributed to the auxiliary electronic device disposed outside the computer 20 by one and more DC socket 10a.

Figure 4:
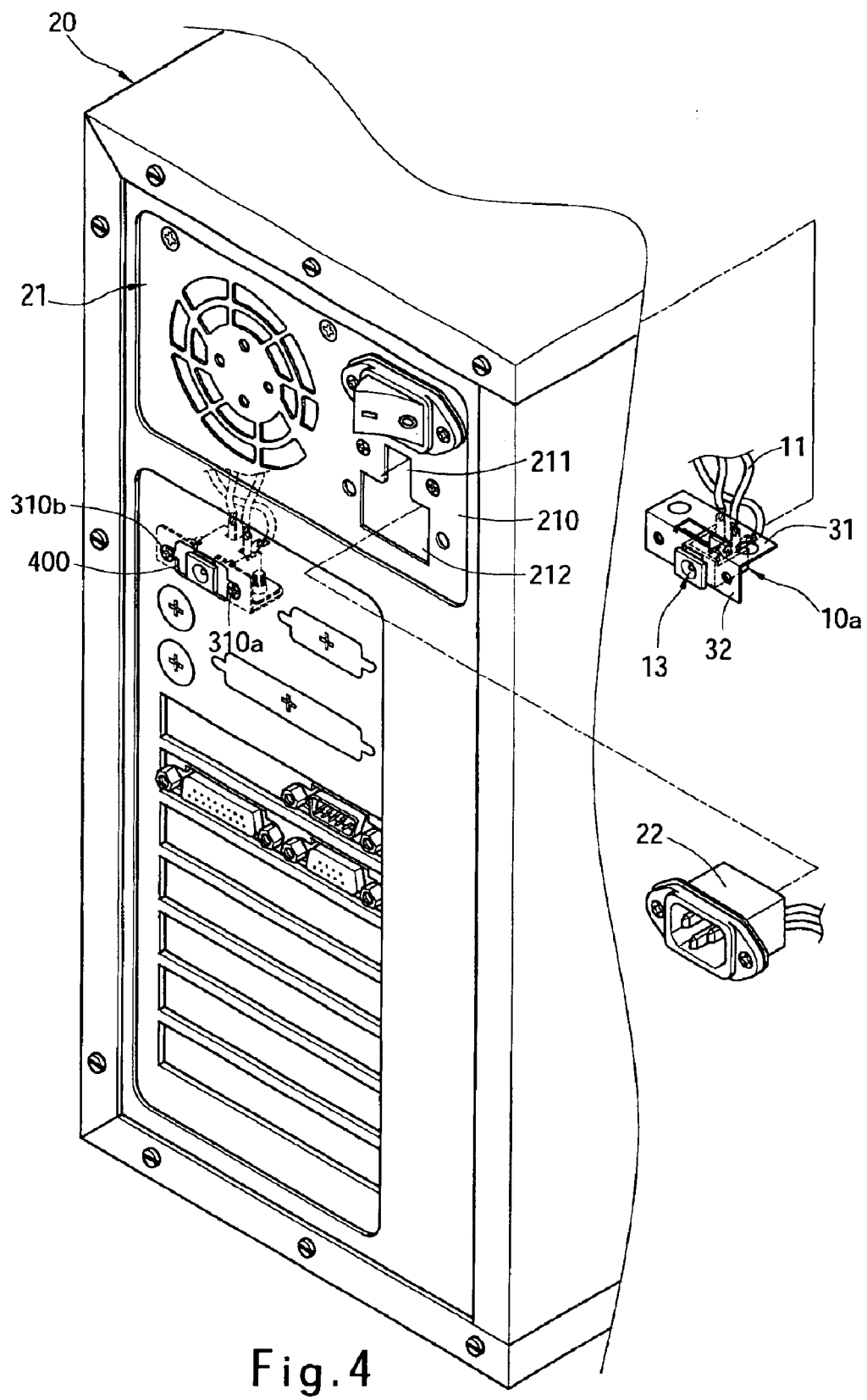
FIG. 4 is an exploded perspective view of a remainder electric power distributing device and a computer according to the third embodiment of the present invention.

Finally, referring to FIG. 4, it depicts the third embodiment according the present invention. The back plate 210 of the power supply 21 is equipped with an opening 211, whose of size must cause the power inlet 13 of the DC socket 10a to be exposed. The preferred position of the opening 211 is at the position near an alternating current (AC) connector 22. Generally, the back plate 210 is a piece shaped metal plate, so the above-mentioned opening 211 can be further formed by extending the installing opening 212 which is used for installing the AC connector 22. The opening 211 can be realizes, but the basic structure of the power supply 21 is not required to change too much.

Therefore, the remainder electric power supplied from the power supply 21 of the computer 20 can be fully utilized by the remainder electric power distribution device according to the present invention, and the trouble and inconvenience caused by installing the transformer and the rectifier of the auxiliary electronic devices disposed outside the computer 20 can be avoided. In addition, the remainder electric power distributing device according to the present invention is designed to comply with the normal specification for installing I/O port, and therefore the power jack 10 of the remainder electric power distributing device according to the present invention is easy to be additionally increase when the original structure and specification of the computer 20 are not changed.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A remainder electric power distributing device for a computer for distributing the remainder electric power supplied from a power supply of the computer to auxiliary electronic devices, comprising:

at least a power jack electrically connected to the power supply of the computer, the power jack including at least one connecting interface exposed on the computer, such that an auxiliary electronic device disposed outside the computer is electrically connected to the power jack, the power jack having a front portion, a rear portion, and a neck connecting the front portion and the rear portion; and a support, the support including a supporting portion and a connecting portion, the connecting portion having a breach for receiving the neck, the supporting portion contacting and supporting the rear portion of the power jack;

a cover, the cover contacting the rear portion of the power jack and the supporting portion for fixing the rear portion on the supporting portion.

2. The remainder electric power distributing device of a computer according to claim 1, wherein the power jack is a direct current (DC) socket.

3. The remainder electric power distributing device of a computer according to claim 1, wherein the power jack is installed on the back plate of the computer by the connecting means.

4. The remainder electric power distributing device of a computer according to claim 3, wherein the power jack is installed at the position reserved in advance for installing an input/output (I/O) port on the back plate.

5. The remainder electric power distributing device of a computer according to claim 1, wherein the power jack is installed on the front plate of the computer by the connecting means.

6. The remainder electric power distributing device of a computer according to claim 5, wherein the power jack is installed at the position reserved in advance for installing an input/output (I/O) port on the front plate.

7. The remainder electric power distributing device of a computer according to claim 1, wherein the power jack is installed on the back plate of the power supply by the connecting means.

8. The remainder electric power distributing device of a computer according to claim 1, wherein the power jack is electrically connected to the power supply of the computer by at least one electric wire.

9. The remainder electric power distributing device of a computer according to claim 1, wherein the power jack is electrically connected to the power supply of the computer by at least one connector.

10. The remainder electric power distributing device of a computer according to claim 2, wherein the power jack is electrically connected to the power supply of the computer by at least one electric wire.

11. The remainder electric power distributing device of a computer according to claim 2, wherein the power jack is electrically connected to the power supply of the computer by at least one connector.

12. The remainder electric power distributing device of a computer according to claim 1, wherein the connecting portion is a first plate and the supporting portion is a second plate, the first plate being perpendicular to the second plate and contacting an end of the second plate.

13. The remainder electric power distributing device of a computer according to claim 12, wherein the cover including a main portion and two wings, the main portion of the cover accommodating the rear portion of the power jack, the two wings contacting the second plate.

14. The remainder electric power distributing device of a computer according to claim 13, wherein the rear portion of the power jack has two sidewalls, the two sidewalls contacting the main portion of the cover.

* * * * *